(No Model.)
W. T. SMITH.
BORING AND CUTTING TOOL.
No. 569,433. Patented Oct. 13, 1896.
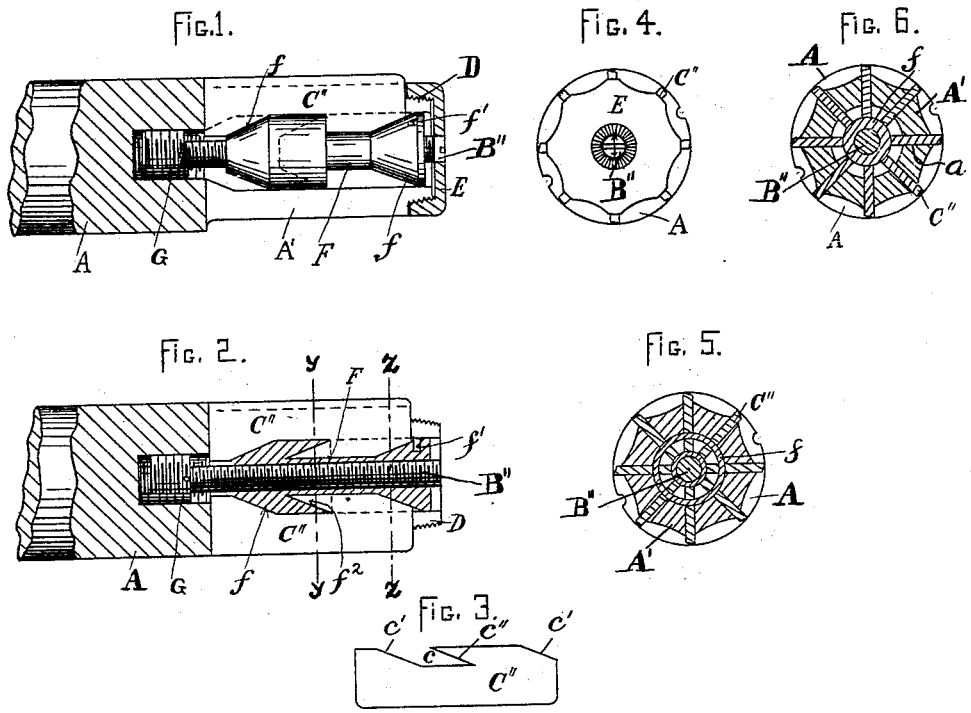
Witnesses
A. D. Harrison.
A. D. Adams
Inventor
W. T. Smith
by Wright Brown & Quimby
Attorneys

UNITED STATES PATENT OFFICE.

WILLIAM T. SMITH, OF BOLTON, ENGLAND, ASSIGNOR OF ONE-THIRD TO BEN WALMSLEY, OF SAME PLACE.

BORING AND CUTTING TOOL.

SPECIFICATION forming part of Letters Patent No. 569,433, dated October 13, 1896.

Application filed April 18, 1896. Serial No. 588,089. (No model.) Patented in England July 9, 1892, No. 12,676.

*To all whom it may concern:*

Be it known that I, WILLIAM THOMAS SMITH, a subject of the Queen of Great Britain, residing at Church Street, Bolton-le-Moors, in the county of Lancaster, England, have invented a new and useful Boring and Cutting Tool, (for which I have obtained a patent in Great Britain, No. 12,676, bearing date July 9, 1892,) of which the following description is a specification.

My invention relates to boring and cutting tools of the class known as "reamers" and "taps;" and the object of my invention is to produce such a boring and cutting tool as will afford facilities for the removal, sharpening, and proper adjustment of its cutting edges as occasion or necessity may require, and this object I attain by following the method of construction illustrated in the accompanying drawings, in which—

Figure 1 is a longitudinal sectional view of a tool constructed in accordance with my invention, certain of the inner fittings being shown in elevation. Fig. 2 is a similar view to Fig. 1, but shows a part of the inner fittings in section. Fig. 3 is an elevation of the cutter detached. Fig. 4 is an end view of parts shown in Fig. 1. Figs. 5 and 6 are transverse sections on lines $y\,y$ and $z\,z$, respectively, Fig. 2.

The shank or cutter-holder A is constructed preferably of hardened steel and of a diameter closely approximating although a little less than that to which the cutters C″ are to be set, while its outer portion A′ is reduced by an eighth of an inch, more or less, in diameter for a length equal to that of said cutters C″.

In the outer part A′ of the holder A are cut the radial slots or grooves $a$, (see broken lines in Fig. 2,) extending to a central opening bored therein, and preferably at slightly unequal distances apart from each other.

The extreme end of the holder A is turned down and tapered and formed with a screw-thread, as shown at D, and a screw-threaded cap E fits over said end and when screwed up tightens the several sections of the end of the holder, pressing them firmly upon or against the cutters C″, so as to hold these latter securely in position.

The end of the holder A between the cutters C is preferably hollowed out to leave room or afford space for the cutting, although instead of being thus hollowed straight or flat parts may be formed thereon.

The cutters C″ are formed with inclines $c'$ on their inner edges, and correspondingly inclined or tapered surfaces $f$ are formed on a sleeve F, through which a screw B″ passes. The cones $f$ are drilled and tapped to move along the screw B″, and a small peg $f'$ is provided to prevent them turning with the screw. The screw B″ is preferably cut with a left-hand thread and is anchored or secured at one end in the holder A by the thimble G, screwed thereinto, in which it is free to rotate, but which prevents longitudinal movement. On the screw B″ being turned to the right the inclined or tapered surfaces are moved thereon and the cutters C″ are raised or expanded. The amount of movement which takes place is shown on the index or vernier on the outside of the cap, (see Fig. 4,) the end of the screw B″ projecting through a hole in the center of the cap. One of the cones is formed hollow, as shown at $f^2$, and the cutter C″ is formed with a recess $c$ to provide a reëntrant incline $c''$ for engagement with the corresponding wall of the recess $f^2$. On the screw being turned to the left the cones are drawn back and the cutters are drawn inward by the engagement of the said reëntrant inclines.

It is evident the invention is not confined to the embodiment here shown and described, but is susceptible of being carried out in other ways.

Having thus described my invention, what I claim is—

1. In a tool of the character described, the combination of a holder centrally bored and radially slotted; cutters occupying the slots and inclined on their inner edges and also formed with reëntrant inclines; a conical expanding device occupying the bore of the holder and engaging the inclined inner edges of the cutters and recessed for engagement with the reëntrant inclines of the latter; and means for adjusting said expanding device longitudinally of the holder for the purpose described.

2. In a boring and cutting tool the combination of a shank or holder having radial slots, cutters fitting within these slots and having inclined and recessed parts formed on their inner edges, a sleeve having inclined and hollowed parts formed on it, a screw for operating said sleeve, and a cap for securing these parts, substantially as described.

WILLIAM T. SMITH.

Witnesses:
JOHN WHITEHEAD,
ARTHUR C. HALL.